US007103769B1

(12) United States Patent
Fleming et al.

(10) Patent No.: US 7,103,769 B1
(45) Date of Patent: Sep. 5, 2006

(54) IEEE 1394 LINK LAYER CHIP WITH "5C" AUTHENTICATION AND KEY EXCHANGE ACCELERATOR

(75) Inventors: George Fleming, Hampshire (GB); Bruce Murray, Hampshire (GB); Don Tolsch, Albuquerque, NM (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/517,884

(22) Filed: Mar. 3, 2000

(51) Int. Cl.
  *G06F 17/00* (2006.01)
(52) U.S. Cl. .................... 713/151; 713/150; 713/153
(58) Field of Classification Search ............... 713/151, 713/152, 201, 153, 150; 380/149, 150, 201, 380/37; 709/200–253
  See application file for complete search history.

(56) References Cited

U.S. PATENT DOCUMENTS

| 4,956,863 A | * | 9/1990 | Goss | 380/30 |
| 4,995,082 A | * | 2/1991 | Schnorr | 713/169 |
| 5,148,481 A | * | 9/1992 | Abraham et al. | 380/46 |
| 5,627,893 A | * | 5/1997 | Demytko | 380/30 |
| 5,748,740 A | * | 5/1998 | Curry et al. | 705/65 |
| 5,815,577 A | * | 9/1998 | Clark | 380/52 |
| 5,933,503 A | * | 8/1999 | Schell et al. | 713/189 |
| 6,466,668 B1 | * | 10/2002 | Miyazaki et al. | 380/30 |

OTHER PUBLICATIONS

Tetsuya Izu, Improved Elliptic Curve Multiplication Methods Resisitant against Side Channel Attacks, 2002, INDOCRYPT, pp. 296-313.*

Sarwono Sutikno, Ronny Effendi, Andy Surya, "Design and Implmentation of Arithmetic Processor F2155 for Elliptic Curve Cryptosystem", 1998, Intrgrated System Laboratory, IEEE, pp. 647-650.*
Alfred J. Menezes, Handbook of Applied Cryptograpgy, 1997, CRC Press LLC, p. 33.*
Ivan Leung, Elliptic Curve Diffie-Hellman Key Exchange, Jun. 5, 2001, webpage:http://www.cse.cuhk.edu.hk.*
Don Johnson, Alfred Menezes, The Elliptical Curve Digital Signature Algorithm, certicom.*
LLK: a link-layer key establishment scheme for wireless sensor networks; Yun Zhou; Yanchao Zhang; Yuguang Fang; Wireless Communications and Networking Conference, 2005 IEEE vol. 4, March 13-17, 2005 pp.1921-1926 vol. 4.*

(Continued)

*Primary Examiner*—David Jung

(57) ABSTRACT

Authentication and key exchange functions, such as those conforming to the Digital Transmission Licensing Authority's (DTLA) Digital Transmission Content Protection (5C) Specification, are incorporated into a link-layer access device of a conventional processing system. Because of the suitability of IEEE 1394 for transferring audio/video information, these functions are preferably embodied in an IEEE 1394 compatible link-layer access device. The link-layer access device of this invention is configured to support, for example, the elliptic curve multiplication functions of a Diffie-Hellman key exchange process, as well as digital signature generation and digital signature verification. By incorporating the authentication and key exchange functions into a link-layer access device, the system architecture and devices that are commonly used in conventional processing systems can be used, thereby providing an incremental path toward increased protection of copyright material. In a preferred embodiment, the conventional link-layer controller is configured to implement the authentication and key exchange processes, via calls to the link-layer access device to perform the complex mathematical operations, thereby eliminating the need for each application-layer program or device to implement these processes.

5 Claims, 1 Drawing Sheet

OTHER PUBLICATIONS

Link layer security for SAHN protocols; Muhammad Mahmudul Islam; Pose, R.; Kopp, C.; Pervasive Computing and Communications Workshops, 2005. Third IEEE International Conference on Mar. 8-12, 2005 pp. 279-283.*

IEEE 802.11 roaming and authentication in wireless LAN/cellular mobile networks; Minghui Shi; Xuemin Shen; Mark, J.W.; Wireless Communications, IEEE [see also IEEE Personal Communication] vol. 11, Issue 4, Aug. 2004 pp. 66-75.*

* cited by examiner

＃ IEEE 1394 LINK LAYER CHIP WITH "5C" AUTHENTICATION AND KEY EXCHANGE ACCELERATOR

BACKGROUND OF THE INVENTION

1. Field of the Invention

This invention relates to the field of communications, and in particular to secure communications via an IEEE 1394 (firewire) interface.

2. Description of Related Art

Secure communications between and among devices is becoming increasingly important for the protection of copyright material and other communiqués. An organization known as the Digital Transmission Licensing Authority (DTLA) has created the Digital Transmission Content Protection Specification, commonly known as the "5C" specification. The 5C specification defines a cryptographic system comprising a number of cryptographic components, including methods for enciphering and deciphering content material, and methods for determining secure cryptographic keys for use in this enciphering and deciphering of the content material.

A commonly used protocol for the transmission of audio/visual material among audio/visual applications is the IEEE 1394 protocol and interface. Special purpose controllers have been developed to support the transfer of enciphered material between an application program and the IEEE 1394 bus interface, including the enciphering and deciphering of the content material being transferred in accordance with the 5C specification, based on cryptographic keys that are provided by the application program. As is known in the art, given a sufficiently robust key, the enciphering and deciphering of information can provide a high level of security, and can be effected with relatively little overhead, being based primarily on a "shift and add" or similar operation. The complexity required to generate the keys that are used to perform the enciphering and deciphering, on the other hand, is substantial. To minimize the potential damage caused by a breach of security of keys, the 5C specification calls for the generation of unique keys by the devices involved in the transfer of the information. A discovery of the keys that are used by one pair of devices provides no information concerning the keys used by another pair of devices. When a communication of protected information is required, the devices generate a unique set of keys for ciphering and deciphering the information. The generation of unique keys for each session of information transfer is effected via a "key exchange", which is an exchange of parameters that are used to generate keys within each device.

In the 5C specification, an elliptic curve Diffie-Hellman key exchange, and an elliptic curve Digital Signature algorithm is specified for full authentication. The elliptic curve computations are known in the art, and are mathematically complex. For sufficient security, the computations use relatively large numbers, in the order of 160 or more bits. The 5C specification requires that these operations be completed in a limited amount of time, for operation effectiveness, as well as security reasons. Because of the mathematical complexity and required efficiency, a conventional implementation of these tasks includes a software program that is executed on a high-performance microprocessor. For example, on a home computer system with an IEEE 1394 interface, the application program that is used to transfer the information to other devices contains the sub-programs that compute or verify digital signatures, and, if the signatures are verified, effect a key exchange. These sub-programs are typically run on a Pentium® or similar high performance processor, via, for example, a "C" program that includes complex operations that are known to be computationally irreversible. That is, a knowledge of the output of the complex operation provides little or no information regarding the parameters that were used to generate the output. For example, in the context of the 5C specification, elliptic curve cryptography is based on a determination of a point on an elliptic curve based on another point on the curve.

As the name "key exchange" implies, both the device that will be transmitting the protected information, and the device that will be receiving the protected information must participate in this exchange, and therefore both devices must contain sufficient capabilities to effect the above described key exchange computations. Although the execution of a key exchange on a home computer is feasible, the cost of a high performance microprocessor can be prohibitive in many applications, specifically consumer electronic equipment, such as video recorders, CD players, and the like. Additionally, each application program on a computer, and each component device that is expected to comply with the 5C specification, must incur the cost of developing and testing, or purchasing and testing, the software required to effect the digital signing and key exchange tasks required by the 5C specification. As an alternative to a high-performance processor running a software program, a special purpose processor can be provided to facilitate the 5C authentication functions, but such a special purpose processor can be expected to require a substantial modification to existing processing systems designs and architectures, and will add costs to each device that is expected to comply with the 5C specification.

BRIEF SUMMARY OF THE INVENTION

It is an object of this invention to facilitate the task of 5C authentication and key exchange. It is a further object of this invention to facilitate the task of 5C authentication and key exchange in an IEEE 1394 environment. It is a further object of this invention to minimize the burden on application programs for effecting authentication and key exchange. It is a further object of this invention to minimize the cost of implementing 5C authentication and key exchange in an IEEE 1394 environment. It is a further object of this invention to provide a device that facilitates 5C authentication and key exchange in existing system architectures.

These objects and others are achieved by incorporating authentication and key exchange functions, such as those conforming to the Digital Transmission Licensing Authority's (DTLA) Digital Transmission Content Protection (5C) Specification, into a link-layer access device of a conventional processing system. Because of the suitability of IEEE 1394 for transferring audio/video information, these functions are preferably embodied in an IEEE 1394 compatible link-layer access device. The link-layer access device of this invention is configured to support, for example, the elliptic curve multiplication functions of a Diffie-Hellman key exchange process, as well as digital signature generation and digital signature verification. By incorporating the authentication and key exchange functions into a link-layer access device, the system architecture and devices that are commonly used in conventional processing systems can be used, thereby providing an incremental path toward increased protection of copyright material. In a preferred embodiment, the conventional link-layer controller is configured to implement the authentication and key exchange processes, via calls to the link-layer access device to perform the complex mathematical operations, thereby eliminating the need for each application-layer program or device to implement these processes.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
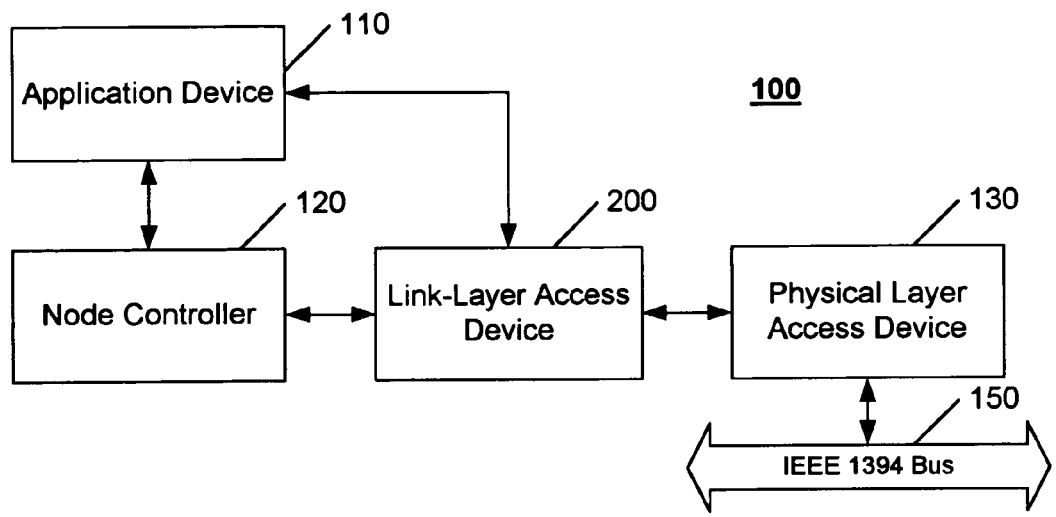
FIG. 1 illustrates an example block diagram of a processing system in accordance with this invention.

FIG. 1 illustrates an example block diagram of a processing system 100 in accordance with this invention. By intent, the architecture of the processing system 100 is substantially identical to that of conventional prior-art processing systems. The processing system 100 includes an application device 110 that communicates with another device (not shown) via a physical-layer communications path, such as an IEEE 1394 bus 150. Consistent with common hierarchical protocol structures, the application device 110 transfers information to the physical-layer communications path via a link-layer access device 200 and a physical-layer access device 130. A node controller 120 manages the flow of information between the application device 110 and the link-layer access device 200, and the processing of information at the link-layer access device 200.

Figure 2:
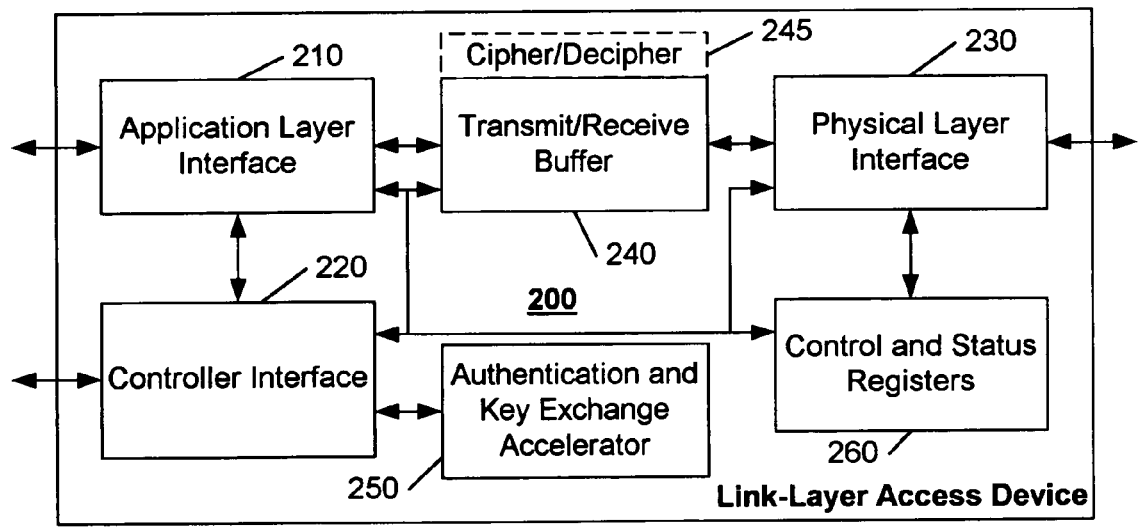
FIG. 2 illustrates an example block diagram of a link-layer access device that facilitates cryptographic authentication and key exchange functions, including key exchange functions, in accordance with this invention.

In accordance with this invention, the link-layer access device 200 includes an authentication and key exchange accelerator 250, as illustrated in FIG. 2. The authentication and key exchange accelerator 250 facilitates cryptographic tasks, such as key exchange, digital signing, and digital signature verification. Copending U.S. patent application, "Simple Algorithmic Cryptography Engine", U.S. Ser. No. 09/466,392, filed 17 Dec. 1999 for George Fleming, Farrell Ostler, and Antoine Dagher, provides a processing architecture that is particularly well suited for cryptographic processing, and is incorporated by reference herein. In the copending application, a variety of techniques are employed to minimize the complexity of the design and to minimize the complexity of the interconnections within the device, thereby allowing the engine to be incorporated within an existing link-layer access device integrated circuit design. A variety of techniques are also employed to ease the task of programming the processor for cryptographic processes, and to optimize the efficiency of instructions that are expected to be required for effecting digital signing, verification, and key exchange. Because authentication and key exchange tasks are characterized by operations on wide data items, particular emphasis is placed on the efficient processing of multi-word operations, including the use of constants having the same width as an instruction word. A simplified arithmetic unit is provided that is specifically designed to support digital signing, verification and key exchange, with minimal overhead.

In a preferred embodiment of this invention, the link-layer access device 200 receives commands from the node controller 120 to effect the provided authentication and key exchange tasks. As is common in the art, the controller 120 is typically a low-cost microprocessor, such as an 8051-type controller, with insufficient processing power to provide the authentication and key exchange tasks. By providing the authentication and key exchange accelerator 250 in the link-layer access device 200, to which the node controller 120 is traditionally coupled, the authentication and key exchange tasks can be off-loaded from the application device 110 without introducing a change to the traditional processing system architecture. Preferably, the link-layer access device 200 of this invention has the same pin-out of prior art link-layer access devices, so that existing processing system designs can be upgraded to include authentication and key exchange capabilities via changes to the software and/or firmware used in the node controller 120. The resultant combination of node controller 120 and link-layer access device 200 substantially eliminates the need for application devices 110, and corresponding application-layer programs, to include the complex operations required to effect digital signing, verification, and key exchange, thereby minimizing the development time and cost for introducing DTLA 5C security to copy protected material.

The node controller 120 is configured to control the sequences involved in authentication and key exchange processes, and to provide cryptographic parameters and commands to the link-layer access device 200, as required, via the controller interface 220 of the link-layer access device 200. The authentication and key exchange accelerator 250 of the link-layer access device 200 is configured to perform the complex mathematical operations required to produce cryptographic items to fulfill each command, based on the parameters provided by the controller 120 or stored within the link-layer access device 200. For ease of reference, the terms cryptographic items and parameters are used herein to include the parameters, arguments, intermediate results, final results, and so on, that are communicated among and between devices for the purpose of effecting a task related to cryptography, such as digital signing, verification, and key exchange and generation. In a preferred embodiment, the link-layer access device 200 is configured to perform the following operations, in response to corresponding commands from the node controller 120:

Basepoint Multiply (first phase of Diffie-Hellman key exchange)

Point Multiply (final phase of Diffie-Hellman key exchange)

EC-DSA Verify (verify digital signature of a message)

EC-DSA Sign (digitally sign a message), where EC-DSA corresponds to the Elliptic-Curve Digital Signature Algorithm, common in the art. The basepoint multiply and point multiply operations include the aforementioned elliptic curve multiplication operations that provide a point on an elliptic curve based on another point on the curve and one or more parameters associated with the elliptic curve Diffie-Hellman key exchange algorithm, common in the art. The EC-DSA verify operation verifies a source of a message from another device, based on a key associated with the other device. The EC-DSA sign operation binds a cryptographic item to the message, to facilitate a subsequent verification of the source of the message at another device, based on a key associated with this device.

In a Diffie-Hellman key exchange, each device chooses a local parameter, such as a large random number, and computes a particular function with this parameter as an argument. The result of this function is communicated to the other device. Each device then computes a second function with the communicated item and its local parameter as arguments. The two functions that are applied in this exchange are such that the result provided by the second function in each device is identical, and also such that knowledge of the communicated items provides no assistance to a third party in determining the common result. For example, consider x and y being the local parameters of each device, and the result of a modular exponentiation of a commonly known integer g by the local parameter x, y ($X=g^x$ mod m; $Y=g^y$ mod m) being the communicated items X and Y, where m is also commonly known to each device. Each device computes a second modular exponentiation of the received item ($K1=Y^x$ mod m; $K2=X^y$ mod m). Both K1 and K2 will be equal to $g^{xy}$ mod m ($K1=(g^y$ mod m$)^x$ mod m; $K2=(g^x$ mod m$)^y$ mod m), and, provided that x, and y are large, a knowledge of g, m, X, and Y provides little or no assistance in determining the value $g^{xy}$ mod m. This common result of the second function ($g^{xy}$ mod m) at each device is used as the key for ciphering and deciphering messages. In an embodiment that satisfies the 5C specification, the functions are elliptic curve functions, rather than exponentiation functions, although this invention is not, per se, limited to the 5C specification or elliptic curve functions. In a preferred embodiment, the link-layer access device 200 facilitates the authentication processes of signing and verifying, as well as key exchange, by providing operations that are commonly used in cryptographic applications, such as exponentiation or elliptic curve multiplications, and are too complex for embodiment in a low-cost microcontroller 120. The microcontroller 120 in this preferred embodiment, on the other hand, controls the sequence of operations, the communication of parameters with the link-layer access device 200, and so on, to effect the appropriate authentication and key exchange tasks.

The link-layer access device 200 of this invention includes the components required to perform conventional link-layer access operations, thereby providing the aforementioned authentication and key exchange operations at a minimal incremental cost compared to conventional processing system. The link-layer access device 200 includes an application-layer interface 210 that provides the communications interface with the application device, or devices, 110 of FIG. 1, and a physical-layer interface 230 that provides the communications interface with the physical-layer device, or devices, 130. Conventional control and status registers 260 are used to facilitate the interaction of the link-layer access device 200 with the physical and application layer devices via the appropriate interface 230, 210. For example, the 1394 protocol supports both isochronous and asynchronous communications. The isochronous, or "real-time", data must be placed on, and removed from, the 1394 bus 150 at specific intervals, to achieve, for example video renderings at a specific frame rate. Asynchronous communications are achieved by communicating data whenever the bus 150 is available. The transmit/receiver buffer 240, as its name implies, buffers the data received from either domain, as required. As shown, for completeness, the link-layer access device 200 may include an optional cipher/decipher device 245 that ciphers or deciphers the information being transferred through the buffer 240. The key that is used for this cipher/decipher operation is provided to the device 245 by the node controller 120, via the controller interface 220, after the aforementioned key exchange process is completed.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the invention has been presented using the paradigm of DTLA 5C authentication and key exchange tasks in an IEEE 1394 environment. Although the details of this invention are particularly well suited for DTLA 5C authentication and key exchange and IEEE 1394 communications, one of ordinary skill in the art will recognize the suitability of this invention to other security schemes, and other communications protocols. In like manner, the authentication and key exchange accelerator 250 has been presented as supporting four operations that facilitate cryptographic operations, although fewer or more operations may be supported, depending upon the circuit area in the link-layer access device 200 that can be devoted to cryptographic tasks. For example, random number generation, hashing, and the like can be added to the link-layer access device 200, if the required circuit area for these functions is available. These and other system configuration and optimization features will be evident to one of ordinary skill in the art in view of this disclosure, and are included within the scope of the following claims.

We claim:

1. An integrated circuit command comprising:
    a link layer access device responsive to a controller performing communications between an application device and another device across a communications bus in accordance with a communication protocol; and
    a cryptographic accelerator responsive to said controller for performing one or more cryptographic functions other than encryption and decryption.

2. The integrated circuit of claim 1, wherein the one or more cryptographic functions include at least one of:
    calculation of a digital signature,
    verification of a digital signature, and
    calculation of a cryptographic key item.

3. The integrated circuit of claim 1, wherein
    the link-layer access device includes a multiplication device that is configured to derive a second point on an elliptic curve from a first point on the elliptic curve, based on one or more of the parameters from the controller.

4. The integrated circuit of claim 1, wherein
    the controller is configured to effect an exchanger cryptographic key with an other processing system, and
    the one or more cryptographic functions includes calculation of the cryptographic key.

5. The integrated circuit of claim 1, wherein
    commands from the controller include: a basepoint multiply command, a point multiply command, an EC-DSA verify command, and an EC-DSA sign command.

* * * * *